United States Patent [19]

Hatfield

[11] Patent Number: 5,010,780
[45] Date of Patent: Apr. 30, 1991

[54] DEVICE FOR ACTUATING A REMOTELY POSITIONED SPRING-BIASED LATCH

[75] Inventor: Hugh S. Hatfield, Lenoir City, Tenn.

[73] Assignee: Plastic Industries, Inc., Athens, Tenn.

[21] Appl. No.: 523,538

[22] Filed: May 15, 1990

[51] Int. Cl.⁵ ............................................. F16C 1/10
[52] U.S. Cl. ............................... 74/501.5 R; 74/502.4; 74/523; 74/538
[58] Field of Search ........................ 74/500.5–502.6, 74/503, 538, 523, 557; 192/111 A

[56] References Cited

U.S. PATENT DOCUMENTS

| | | | |
|---|---|---|---|
| 3,757,612 | 9/1973 | Schaefer | 74/500.5 |
| 4,031,773 | 6/1977 | Marechal | 74/502.4 |
| 4,297,912 | 11/1981 | Marechal | 74/502.4 |
| 4,454,785 | 6/1984 | Purrer | 74/523 |
| 4,473,141 | 9/1984 | Mochida | 74/538 X |
| 4,688,661 | 8/1987 | Gockel et al. | 192/111 A |
| 4,747,278 | 5/1988 | Roncelli | 74/557 |
| 4,774,850 | 10/1988 | Shovlin | 74/538 X |
| 4,850,240 | 7/1989 | White | 74/500.5 |
| 4,909,096 | 3/1990 | Kobayashi | 74/538 |

FOREIGN PATENT DOCUMENTS 1486114 9/1977 United Kingdom .................. 74/538

Primary Examiner—Vinh T. Luong
Attorney, Agent, or Firm—Kerkam, Stowell, Kondracki & Clarke

[57] ABSTRACT

Structures for actuating a remotely positioned, spring-biased latch mechanism or mechanical actuator consisting of a sheathed control cable having one end connected to a latch mechanism, a plastic housing, having fitted therein a plastic shuttle. The shuttle is attached to one end of the flexible cable, and the housing is attached to the cable sheath. A push button has a stem which passes through the shuttle, and the stem and the shuttle have cooperating, inclined walls such that when the button is depressed, the shuttle is cammed laterally to actuate the latch.

6 Claims, 4 Drawing Sheets

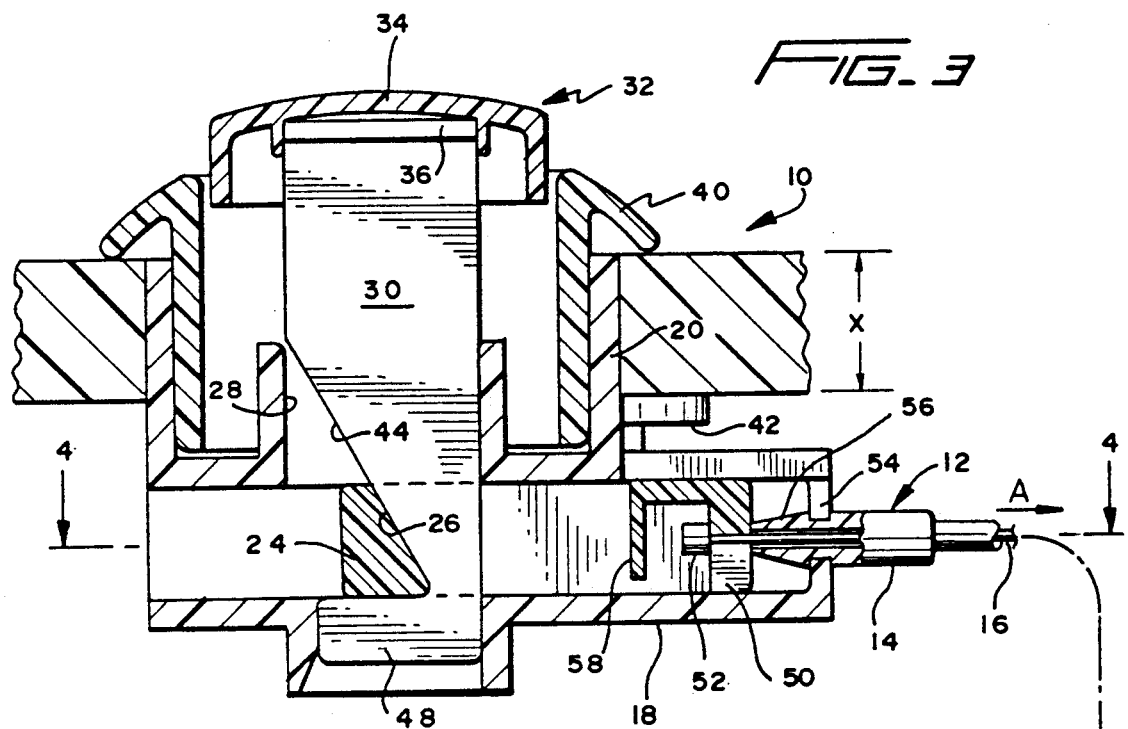
FIG_3
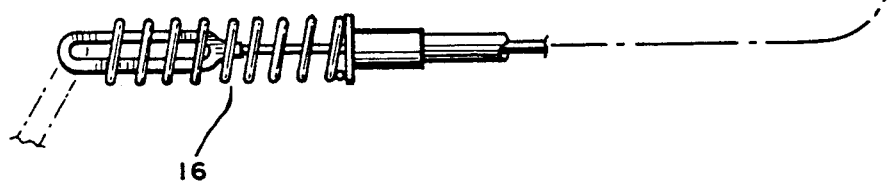
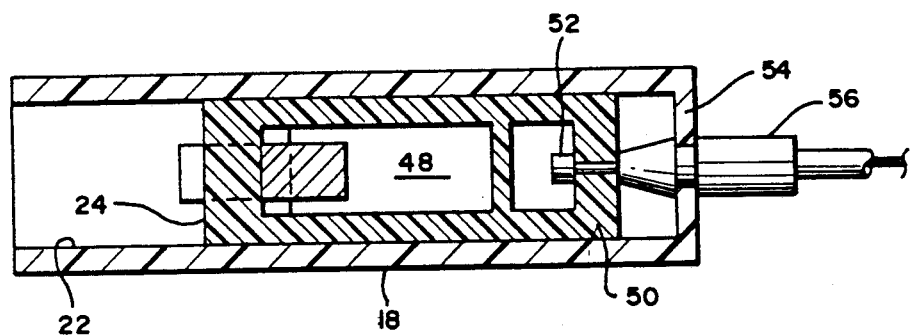
FIG_4

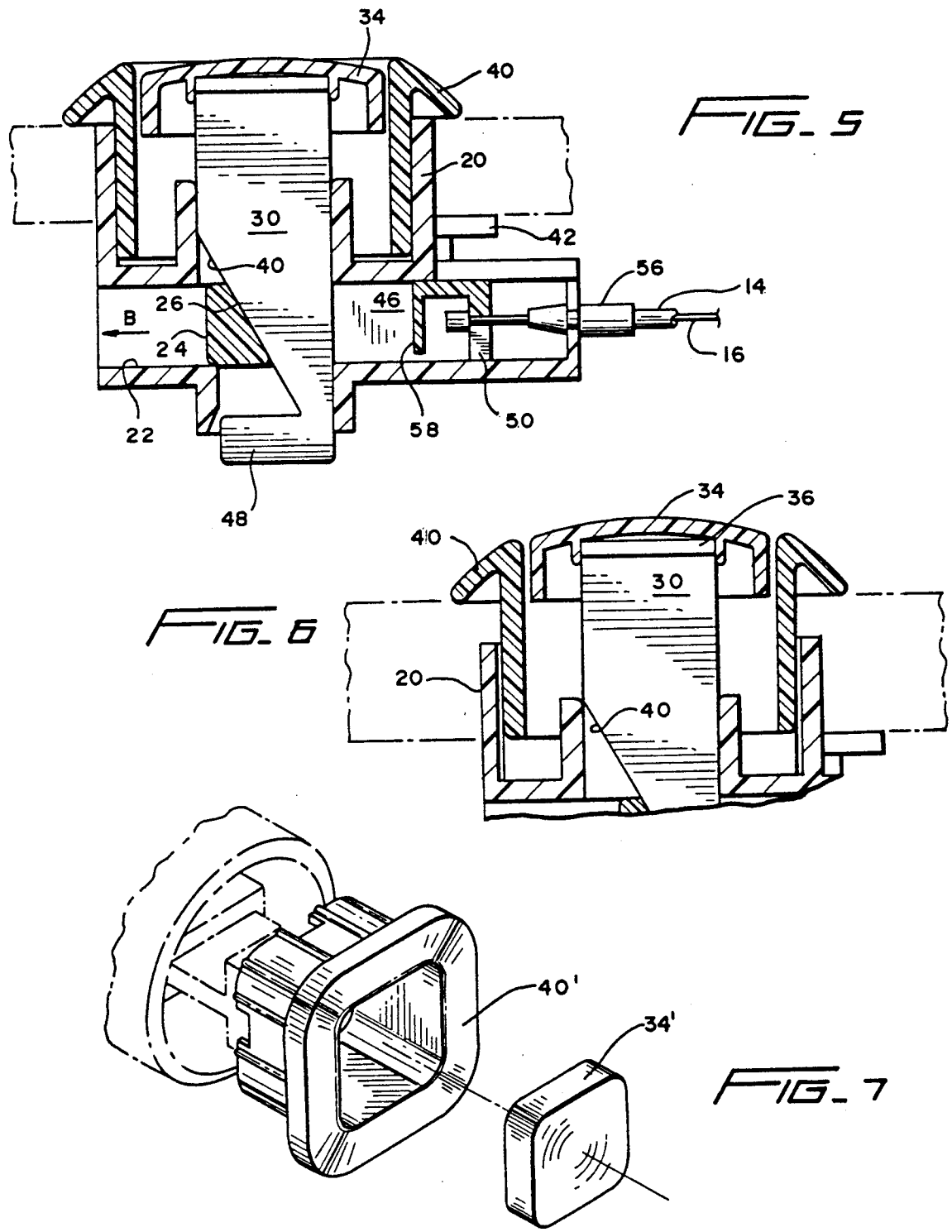

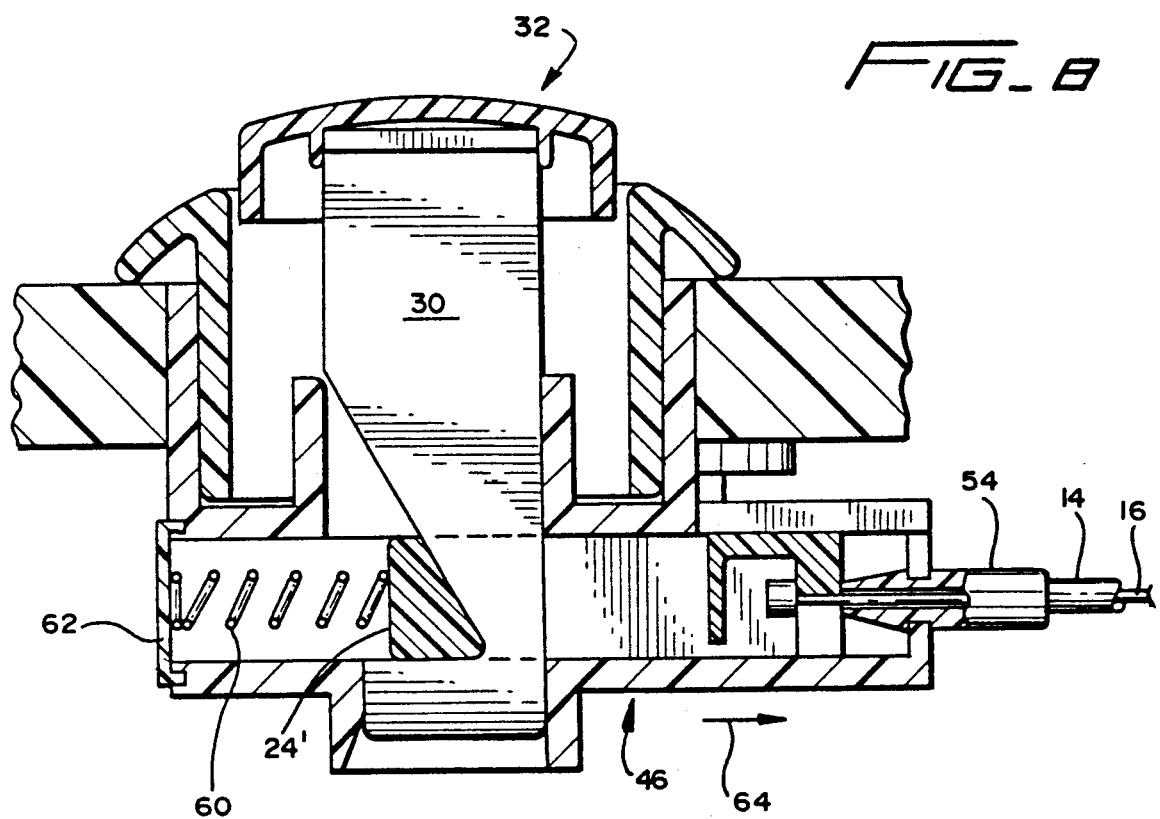
FIG_8

1

DEVICE FOR ACTUATING A REMOTELY POSITIONED SPRING-BIASED LATCH

BACKGROUND OF THE INVENTION

1. Field of the Invention

The invention relates to a device for actuating a remotely positioned, spring-biased latch mechanism or mechanical actuator via a sheathed control cable.

2. Description of the Prior Art

Sheathed control cables are used for numerous purposes for actuating remotely positioned latch mechanisms and, in particular, for use in upholstered motion seating.

It is the particular object of the present invention to provide a decorative, as well as a functional, assembly, which, other than the sheathed control cable, is assembled from basically injection molded components. It is another object of the invention to provide an assembly which is attachable to motion furniture and has the option of interchangeable buttons and bezels for various aesthetic looks.

It is a further object to provide actuators which are relatively quiet, have extended travel, low friction, and can be mass produced at relatively small component cost.

SUMMARY OF THE INVENTION

According to the invention, there is provided a device for actuating a remotely positioned, spring-biased latch mechanism or mechanical actuator generally comprising a sheathed control cable having one end connected to a latch mechanism. The actuating mechanism includes a plastic housing, having fitted therein a plastic shuttle. The shuttle has attaching means for the flexible cable, and the housing has attaching means for the cable sheath. The assembly also includes a push button, having a stem which passes through the shuttle, and the stem and the shuttle have cooperating, inclined walls whereby when the button is depressed, the shuttle is cammed laterally to actuate the latch mechanism.

BRIEF DESCRIPTION OF THE DRAWINGS

Embodiments of the invention will now be described, by way of examples, with reference to the accompanying diagrammatic drawings in which:

FIG. 3 is a sectional view on line 3—3 of FIG. 1 through the actuating mechanism shown in FIG. 2;

FIG. 4 is an enlarged, fragmentary view on line 4—4 of FIG. 3 of the shuttle and a portion of the housing;

FIG. 5 is a detailed view like FIG. 3 of the actuating mechanism in the actuating position;

FIG. 6 is a detailed view of the button housing and ferrule of the actuating mechanism shown in FIG. 5;

FIG. 7 is a modified form of the invention illustrating a quadrangular button and ferrule; and FIG. 8 is a view like FIG. 3 of a modified form of the present invention.

DESCRIPTION OF PREFERRED EMBODIMENTS

Figure 1:
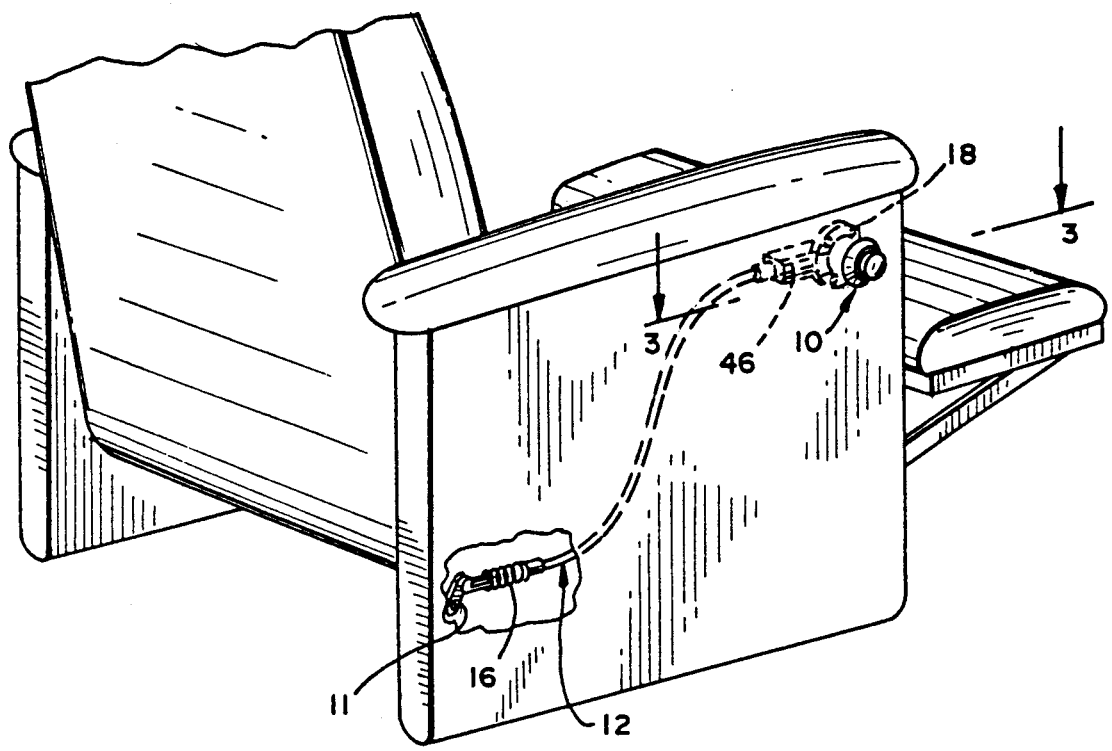
FIG. 1 is a fragmentary prospective view of the invention applied to a motion seating.
Figure 2:
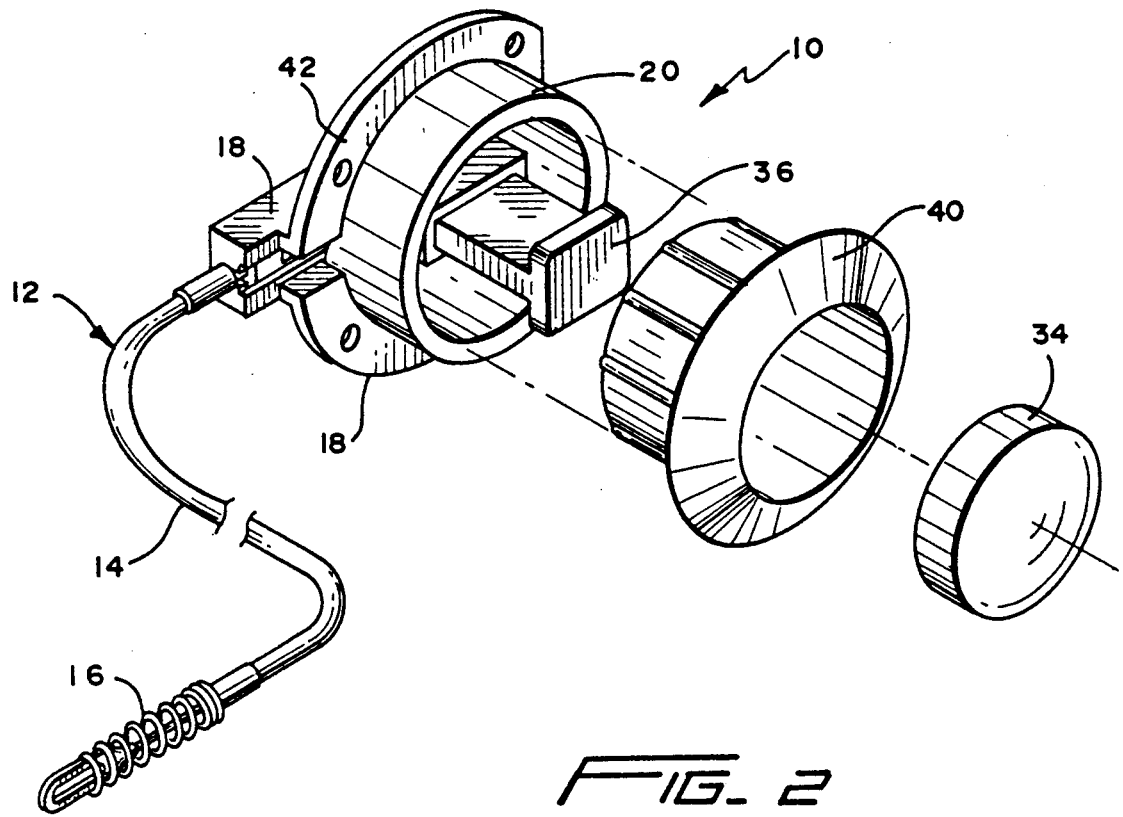
FIG. 2 is a fragmentary exploded view of the actuating mechanism of the invention.

Referring to the drawings, the device for actuating a remotely positioned latch mechanism is generally designated 10. The latch mechanism, shown in FIG. 1 of the drawings and designated 11, is attached to the actuator via a flexible sheathed cable, generally designated 12, consisting of a sheath 14 and a flexible cable 16 The unit 10 comprises a housing 18, having an upstanding wall 20 and a transverse passage 22 at the base of the well-forming wall 20. In the transverse passage is a shuttle 46, one wall 24 of which has a sloping face 26. In a preferred embodiment of the invention, the slope of the wall or face 26 is about 60°.

The housing 18 has a opening therethrough, designated 28, in which a stem 30 of a push button assembly, generally designated 32, comprising the stem 30 and a push button 34, reciprocates. The stem 30 has a rectangular head 36, which is cemented to depending attaching means 38, molded with button 34. The button 34 reciprocates in a bezel or ferrule 40, which is press-fitted in the well formed by the upstanding wall 20. The bezel 40 is press-fitted so that the distance, designated X in FIG. 3, can be varied to accommodate different thicknesses of panels to which the button or actuating assembly is attached so that the button is fully extended, partially extended or flush with the top of bezel. The assembly 10 is attached to the panel by a plurality of screws, or other attaching means, passing through the flange 42 of the housing assembly. In this preferred form of the invention, the button and the bezel 34/40 are circular in configuration; however, the bezel 40 may be square, quadrangular, or other configuration, as at 40', and receive a square or quadrangular button 34', as best illustrated in FIG. 7. In a best-mode configuration, the housing 18 is molded of plastic material, which may comprise LEXON polycarbonate resin. Further, the stem 30 may be CELCON ethyl cellulose thermoplastic resin and button 34 would be styrene in a best-mode configuration.

A lower portion of the stem 30 has a sloping or inclined wall or face 44, which mates with the inclined face 26 on the shuttle 46. The lower end of the stem 30 has a stop member 48, which engages the end wall 24 of the shuttle 46 when the stem is in its upward position, as illustrated in FIG. 3. This prevents the stem and button from leaving the surrounding bezel 40 and unit 10.

The shuttle slides transversely in the transverse opening 22 in the housing 18. The end of the shuttle 46, remote from the end wall 24, has a recess 50. The recess 50 receives the extended end of the flexible cable 16, and is anchored in the recess by a bead 52, secured to the end of the flexible cable. The sheath 14 of the flexible cable assembly is secured in the housing 18 in a slotted opening at 54, as illustrated at 56.

In operation of the device, with the cable 16 being urged in the direction of the directional arrow A, the shuttle is engaged on the sloping wall 44 of the stem 30. When the stem is urged downwardly by pressure on the button 34, surface 44 causes the shuttle to move in the direction of the directional arrow B, pulling the cable 16 to release its spring-biased attaching means or mechanical actuator coupled to, for example, the back of a recliner chair, or a footrest on a chair.

When pressure on the button 34 is relaxed, the spring on the latching mechanism (not shown) pulls the shuttle in the direction of directional arrow A, and the mating camming surfaces 26 and 44 return the button to its initial position, as illustrated in FIG. 3.

The stem 30, as hereinbefore set forth, is made of CELCON ethyl cellulose thermoplastic resin plastic, whereas the shuttle 46 is molded from GE (General Electric Company) VALOX thermoplastic resin plastic. It has been found that having the stem 30 and the shuttle 46 molded from dissimilar plastics reduces the tendency of the stem and shuttle to "lock tight."

Referring to FIG. 8, a modified form of the present invention is illustrated, and in this Figure, like parts are designated with identical reference characters and, for the major description of the invention, references should be had to the form of the invention illustrated in FIGS. 1 through 6.

This form of the invention is useful when the assembly is not associated with a spring-biased latch. Since the latch may not be spring-biased, the assembly includes a helical spring 60, which presses against end wall 24', of the shuttle 46 at one end, and the opposite end of the spring 60 is butted against a spring holder 62, thus the shuttle is constantly biased in the direction of directional arrow 64, and pressing the button assembly 32, the stem 30 cams the shuttle 46 toward the spring holder 62, compressing the spring 60. Otherwise, the assembly is identical to that in FIGS. 1 through 6.

While preferred embodiments of the present invention have been disclosed, the invention is only limited by the claims of the application.

I claim:

1. In combination, a remotely positioned, spring-biased latch mechanism and actuating means therefor comprising a control cable, a sheath surrounding the control cable actuator means, one end of the control cable connected to actuator means, a plastic housing, a plastic shuttle slidably mounted in the housing, means on the housing for attaching the sheath of the control cable, means for attaching the other end of the control cable to the shuttle, thereby biasing the shuttle in a direction of the actuator means, a wall on the shuttle inclined in respect to the attached control cable, a push button, a push button stem attached to the push button, means slidably mounting the push button stem in the housing and through an opening in the shuttle, an inclined wall on the push button stem, said inclined wall mating with the inclined wall on the shuttle, whereby when the push button is depressed, the shuttle is cammed laterally to actuate the actuator means.

2. The combination, as defined in claim 1, wherein all of the components are formed on plastic.

3. The combination, defined in claim 2, wherein the push button stem, housing and the shuttle are formed of dissimilar plastics.

4. In combination, a remotely positioned latch mechanism and actuation means therefor comprising a control cable, a sheath surrounding the control cable; actuator means; one end of the control cable connected to said actuator means; a plastic housing; a plastic shuttle slidably mounted in the housing; a spring biasing the shuttle toward the actuator means; means on the housing for attaching the sheath of the control cable; means for attaching the other end of the control cable to the shuttle, thereby biasing the shuttle in a direction of the actuator means; a wall on the shuttle, said wall on the shuttle inclined in respect to the attached cable; a push button; a push button stem attached to the push button; means for slidably mounting the push button stem int eh housing and through an opening in the shuttle; an inclined wall on the push button stem, said inclined wall on the push button stem mating with the inclined wall on the shuttle, whereby when the push button is depressed, the shuttle is cammed laterally against the urging of the spring.

5. The combination, as defined in claim 1, including a flange on said housing for mounting the device to a solid structure.

6. The combination, as defined in claim 1, further including a bezel surrounding the button and slidably mounted in the housing whereby the distance between the button and the top of the bezel may be varied.

* * * * *

UNITED STATES PATENT AND TRADEMARK OFFICE
CERTIFICATE OF CORRECTION

PATENT NO. : 5,010,780
DATED : April 30, 1991
INVENTOR(S) : HATFIELD, Hugh S.

It is certified that error appears in the above-identified patent and that said Letters Patent is hereby corrected as shown below:

Column 4, line 7, "on" should be -- of --.

Column 4, line 24, "int eh" should be -- in the --.

Signed and Sealed this

Third Day of November, 1992

Attest:

DOUGLAS B. COMER

Attesting Officer

Acting Commissioner of Patents and Trademarks